No. 759,951. PATENTED MAY 17, 1904.
C. F. WINCH.
FAN GUARD.
APPLICATION FILED FEB. 26, 1902.
NO MODEL.
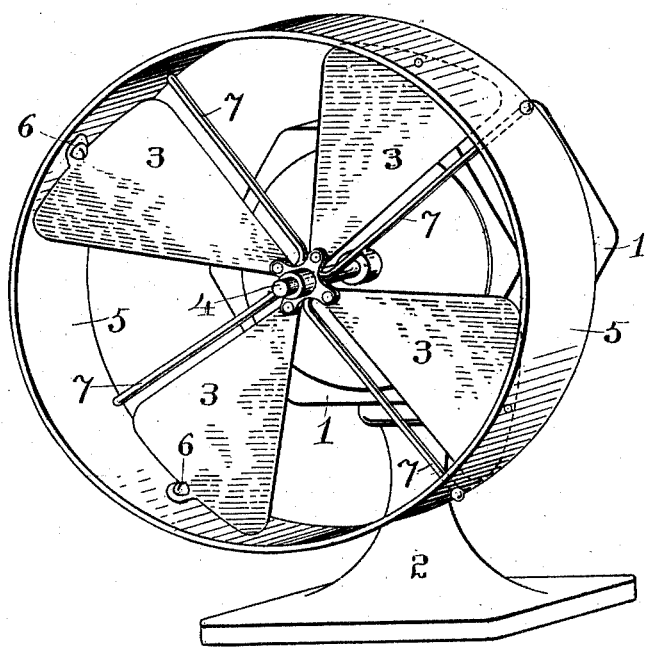
Witnesses:
Otto Greenberg
E. L. Lawler.
Inventor
C. F. Winch
By Townsend + Decker
Attorneys No. 759,951. Patented May 17, 1904.

UNITED STATES PATENT OFFICE.

CHARLES FARLEY WINCH, OF NEW YORK, N. Y.

FAN-GUARD.

SPECIFICATION forming part of Letters Patent No. 759,951, dated May 17, 1904.

Application filed February 26, 1902. Serial No. 95,793. (No model.)

*To all whom it may concern:*

Be it known that I, CHARLES FARLEY WINCH, a citizen of the United States, and a resident of New York city, in the county of New York and State of New York, have invented certain new and useful Improvements in Fan-Guards, of which the following is a specification.

My invention relates to guards for fans driven by electric motors operated in situations where it is necessary to protect the curious and ignorant from injury by placing their hands in positions where they will be struck by the edges of the rotating fan.

It has heretofore been proposed to provide rotary fans with guards which as usually constructed have been mounted so as to be fixed in position relative to the rotating fan-blades. Such guards are usually constructed of open wirework, and inasmuch as they must allow free egress of air they do not effectually prevent any one from inserting a finger into the spaces within which the fan rotates. As a consequence people are frequently injured, and the extent of the injury is very largely increased from the fact that the guard being stationary prevents the hand or finger from being thrown away by the action of the fan and holds it, so that it frequently happens that the fingers of the incautious are cut off.

The object of my invention is to provide a fan-guard which shall be free from the objections incident to the use of stationary guards; and to this end my invention consists of an improved fan-guard comprising, substantially, a ring to which the ends of the fan-blades are attached and guard devices attached to said ring and extending inward through the space in front of the fan-blades, as and for the purpose more particularly hereinafter set forth.

The drawing is a perspective view of a rotary fan furnished with a guard applied in accordance with my invention.

I have shown my invention as carried out in connection with a fan driven by an electric motor 1, mounted upon a suitable standard 2. The blades of the fan, four in number, are indicated by the numeral 3, while 4 indicates the shaft to which the hub of the fan is secured in the usual manner.

The guard shown consists of the ring or cylinder 5, of light metal, whose periphery is preferably continuous and which is secured to ears on the end of the fan-blades, as indicated at 6. Extending laterally from the hub of the fan to the ring or cage 5 are rods 7, which are made of wood or metal and which are mounted just in advance of the forward edge of the fan-blades. These rods 7 are round or blunt, so as to be incapable of doing any injury. They may be arranged to follow exactly the line of the edge of the fan, but preferably are arranged slightly out of line, so as not to interfere with the free entrance of the forward edge of the fan-blade into the body of air which is to be set in motion.

As will be readily seen, the rods 7 effectually prevent the sharp edge of the fan from striking any object inserted into its plane of rotation and will violently expel any foreign object introduced without injury to the same.

The outer periphery of the ring or cylinder 5 being smooth or continuous obviously can do no injury and affords a protection or guard for the outer edge of each fan-blade. This ring 5 might be made, however, of open-work at portions thereof between the fan-blades, care being taken to so fashion the edges of the openings that they cannot do injury.

It will be understood that the blades 3 are, as usual, made of sheet metal for lightness and for effectiveness of action in producing a current of air.

What I claim as my invention is—

The combination with a fan, of the ring 5 secured to the edge of the fan-blades and the rounded guard-rods 7, one for each blade of the fan and extending radially from the hub of the fan to said ring and in advance of the forward edge of the blade.

Signed at New York city, in the county of New York and State of New York, this 25th day of February, A. D. 1902.

CHARLES FARLEY WINCH.

Witnesses:
 EDOUARD C. PANITZ,
 E. L. LAWLER.